United States Patent Office 3,681,047
Patented Aug. 1, 1972

3,681,047
PROCESS FOR BENEFICIATING ILMENITE ORE
Langtry E. Lynd, North Plainfield, Arnold N. Nilsen, Freehold, and Louis E. MacCardle, South Belmar, N.J., assignors to N. L. Industries, Inc.
No Drawing. Filed Nov. 24, 1969, Ser. No. 879,595
Int. Cl. C22b 3/00
U.S. Cl. 75—1
2 Claims

ABSTRACT OF THE DISCLOSURE

A titanium dioxide concentrate suitable for use as chlorination feed material is produced by an oxidation-leaching process wherein the metallic iron is an upgraded metallized ilmenite hereinafter referred to as a metallized ore concentrate, is leached out of the metallized concentrate by vigorously agitating the latter in an aqueous solution containing ferrous and ferric ions and in the presence of air or oxygen whereby the metallic iron is oxidized to soluble ferrous iron which is washed out of the discrete particles of metallized ore concentrate with minimal loss of $TiO_2$ values and thereafter oxidized to form solid particulate iron oxide which is separated from the residual $TiO_2$ concentrate by filtration. The process may be a batch type operation but is preferably a continuous operation wherein the filtrate containing ferrous or ferric ions is recovered and recycled in whole or in part to leach additional metallized ore concentrate.

BACKGROUND OF THE INVENTION

Ilmenites are by far the most widely used materials for the production of titanium compounds such as titanium dioxide and titanium tetrachloride and occur in nature either as weathered ilmenites, typical of which are the beach sands of India, Florida, North Carolina and Australia, or as massive ilmenite such as MacIntyre ore mined at Tahawus, N.Y. In addition to titanium oxide these ores contain numerous other constituents of which the major ore is iron. A typical commercial grade ilmenite ore may comprise from 30-65% titanium oxide and from 20 to 40% iron. The removal of the iron fraction from these ores is especially important in the production of $TiO_2$ pigments and in the preparation of chlorination feed material for the production of titanium tetrachloride. In as much as only minor amounts of iron can be tolerated much research work has been done to achieve the most efficient and economical technique for effecting removal of the maximum amount of iron without loss of the titanium values. These ore beneficiating techniques include mechanical ore dressing operations such as crushing, grinding, screening, followed by gravity, electrostatic or magnetic separation for the removal of the gangue; chemical means wherein the iron fraction is treated in single or multiple stages with various acids to form soluble iron salts or with halogenating gases to produce volatile iron halides; reduction and leaching techniques wherein the iron fraction is metallized and then leached out with a mineral acid; and high temperature slagging operations.

However due to the steadily increasing cost of chemical reagents and the high capital investment required in these earlier ore beneficiating techniques they have failed to satisfy increasing demand for $TiO_2$ concentrates of higher purity at lower production costs.

Recent efforts to overcome these shortcomings of the prior art are illustrated by the disclosure in British Pat. No. 980,864 published June 20, 1965 wherein ilmenite ore is heated in the presence of a reducing agent to metallize the iron fraction after which the metallized ore concentrate is submerged in an aqueous medium i.e. water and vigorously agitated in the presence of an oxidizing gas such as air, $O_2$, $CO_2$ and the like to effect preferential oxidation of the metallic iron and subsequent separation of the iron-oxidation product from the remaining $TiO_2$ concentrate. However the $TiO_2$ concentrates have assayed no higher than 89–90% $TiO_2$ and no lower than 5.0% iron and the time required has ranged anywhere from 6 to 8 hours.

This technique is therefore unsatisfactory not only because the $TiO_2$ concentrate is relatively low in $TiO_2$ and high in iron but also because of the relatively large loss of titanium values during leaching and the prohibitively long leaching time required.

SUMMARY OF THE INVENTION

The present invention relates to a new and improved process for producing titanium dioxide concentrates from titaniferous ores and more especially weathered ilmenties using an oxidation-leaching process which produces $TiO_2$ concentrates assaying up to about 94% $TiO_2$, and as low as from 2.5 to no more than about 4.0% iron in less than half the time required by processes of the prior art; with insignificant losses of $TiO_2$ and with the use of relatively inexpensive reagents. In brief, the process of the present invention is carried out by first upgrading a weathered ilmenite ore using, where necessary, the usual ore dressing technique such as screening followed by gravity, electrostatic and/or magnetic separation for the removal of gangue constituents, after which the upgraded ore is heated under reducing conditions i.e. in the presence of a solid reductant such as coal or coke to metallize the iron values. The metallized ore is then separated from any unconsumed solid reductant and further upgraded by some combination of screening gravity and magnetic separation to remove any residual gangue and form a metallized ore concentrate which is thereafter subjected to the oxidation-leaching treatment of this invention. To this end the metallized ore concentrate is slurried in water and added to an acidified salt solution containing ferrous and ferric ions. This mixture of ore and salt solution which for brevity is hereinafter referred to as an ore concentrate slurry is then heated and to it is added, with agitation, a gaseous oxidizing agent such as air or oxygen. The ore concentrate slurry is maintained at a uniform temperature and at an acid pH for a predetermined length of time during which the metallic iron within the ore particles is oxidized to soluble ferrous ions which, by vigorous agitation of the slurry are washed or leached out of the ore particles and thereupon oxidized by the air or oxygen in the slurry to form finely divided particulate iron oxide which is separated from the leached ilmenite in the slurry by filtration and screening. The leached ilmenite is recovered as a $TiO_2$ concentrate assaying up to about 94% $TiO_2$ and 2.5% or less iron. Moreover the loss of titanium values during the oxidation-leaching process is as low as 0.5% to no more than 1.5% $TiO_2$.

DESCRIPTION OF PREFERRED EMBODIMENT

In its preferred embodiment the invention comprises first upgrading a weathered ilmenite ore to reduce or eliminate gangue. Typical weathered ilmenites are the sands from Florida, North Carolina, India and Australia which have particle size in the range from 35 to 200 mesh by Tyler screen measurement. Typical assays of these beach sands are as follows:

| Compositions | Florida | North Carolina | Quilon | Australian |
|---|---|---|---|---|
| $TiO_2$ | 63.5 | 57.3 | 59.9 | 54.8 |
| Fe (total) | 21.4 | 27.8 | 24.8 | 30.8 |

These ores are dried by heating to a temperature of about 150° C. Since the particle size of the ore, as mined, is within the range ideally suited for oxidation-leaching grinding the ore is usually not necessary and it suffices to upgrade these ores simply by screening and a combination of gravity, electrostatic and magnetic separation to remove gangue materials.

Reduction of upgraded ilmenite ores has been practiced heretofore by either of two methods namely by solid-state reduction wherein the ore, mixed with a solid carbonaceous material such as coal or coke, is heated to a temperature in the range of from 1000–1200° C. in a batch, fluid-bed or continuous rotary kiln type operation or by heating the ore to a somewhat lower temperature i.e. 500–1000° C. in a reducing atmosphere provided by gaseous hydrogen, $CO_2$, CO, coal gas, or combinations thereof, and generally in a fluid-bed type operation. Using either of these reduction techniques a major portion of the iron fraction is converted to metallic iron within the ore particles.

While the process of this invention is comprehensive of either one of the aforementioned reduction operations as befits the particular ore being processed, in its preferred embodiment the substantially gangue-free ilmenite ore is reduced by feeding the ore into a rotary kiln where it is mixed with a solid carbonaceous reducing agent, in this case anthracite coal, of coarser size than the ore and heated to a temperature in the range from 1075 to 1175° C. for from 3 to 8 hours to metallize the iron fraction of the ore. The effectiveness of the reduction operation depends in large measure on the temperature of the reaction, the length of time the ore particles are exposed to the reducing agent and the ratio of reducing agent to ore. When using the beach sands identified above maximum reduction is effected by mixing about 1 part of ore with about 0.4 to 1.0 parts anthracite coal so as to achieve a high degree of metallization of the iron fraction in the ore particles.

Following reduction the metallized ore is cooled by feeding it to a rotary cooling barrel or its equivalent after which the cooled metallized ore is passed over a vibrating screen to separate and remove the unconsumed particles of coal. The coal-free metallized ore is then fed to a magnetic separator which removes any residual gangue materials. As a result of these operations a metallized ilmenite concentrate is formed which will assay from 62 to 72% $TiO_2$, from 35 to 24% Fe (total) and from 32 to 22% Fe (metal).

The unconsumed coal separated from the metallized ilmenite concentrate may be recovered and recycled to the rotary kiln. Similarly any unconsumed coal present in the gangue material recovered during the magnetic separation step may be separated from the gangue and recycled to the kiln thereby effecting a significant economy in the consumption of bituminous coal.

The metallized ore concentrate is then subjected to the oxidation-leaching treatment of this invention to remove the metallic iron occluded in the ore particles. This treatment comprises slurrying the metallized ore concentrate in water in a water to ore ratio of about 7:5 after which the slurry is added to an acidic salt solution containing ferrous and ferric ions and the mixture heated to a temperature in the range from 75 to 85° C. Simultaneously air or oxygen is sparged or otherwise introduced into the heated ore concentrate slurry which is agitated vigorously by any suitable means including the streams of air or oxygen. When air is used it is introduced at a rate of about 70 s.c.f.m./100 lbs. ore, equivalent to 4.36 liters air per minute per hundred grams ore, and when oxygen is used at a rate of about 27 s.c.f.m./100 lbs. ore equivalent to 1.68 liters oxygen per minute per hundred grams ore. The ore concentrate slurry is maintained at an acid pH from 2 to 4 and at the aforesaid temperature for from 1–4 hours preferably ½ to 2 hours, whereby the metallic iron in the ore particles is oxidized to a soluble ferrous iron which, due to the vigorous agitation, is washed out of the ore particles and then oxidized in the slurry to form a solid ferric oxide compound i.e. ferric hydroxide. The latter is separated from the leached ore concentrate by decantation, filtration, screening and the like.

A significant aspect of the present invention is the discovery that by having ferrous or ferric ions present in the ore concentrate slurry in combination with air or oxygen plus vigorous agitation, oxidation of the metallic iron to a soluble ferrous iron within the ore particles takes place far more rapidly and completely than has been possible by previous techniques. The ferric ions may have been introduced into the salt solution initially as a ferric salt or may be formed in situ from ferrous ions as the case may be. Suitable sources of ferric ions may comprise a salt such as ferrous or ferric sulfate or ferrous or ferric chloride or alternatively a combination of a ferrous salt such as ferrous sulfate (copperas) and an acid i.e. sulfuric or hydrochloric.

Further while these salts and/or combination of salts and acids plus oxygen or air together with vigorous agitation produces effective leaching in far less time than is the case by earlier techniques it has also been found that even superior results are achieved by adding an accelerator such as gaseous $SO_2$ or a water soluble sequestering agent such as citric acid, tartaric acid and the like to the slurry before or during leaching. Also experience has shown that once the oxidation-leaching action has begun the presence of solid iron hydroxide in the ore concentrate slurry accelerates the leaching action.

By way of generalizing on the amounts of salts and/or acids used to maintain ferric ions in the ore concentrate slurry it has been found for example that when ferric chloride is used the amount may range from 7.0 to 25.0% on an ore weight basis; and when ferrous chloride or ferrous sulfate, as copperas ($FeSO_4 \cdot 7H_2O$) is used in combination with an acid such as sulfuric acid the amount of salt added may range from 12.0% up to 300% on an ore weight basis, the amounts of acid ranging from 1.8 to 3.0%.

Concerning the addition of the aforesaid salts and acids (if used) these may be added at the start of the oxidation-leaching treatment or added in whole or in part at one or more selected intervals thereafter. Moreover experience has shown that when gaseous $SO_2$ is added to accelerate the leaching action it may be added at the rate of about 50 ml./min./100 g. ore and preferably after the leaching action has begun.

Throughout the oxidation-leaching action enough acid is present in the slurry to maintain the pH in the range of from 2 to 4.

The rate of extraction of the iron fraction from the ore concentrate depends both on the severity of agitation and the nature of the oxidizing agents used. Thus when air is used in conjunction with a ferric salt in solution the time required to extract the iron fraction to its ultimate low level i.e. less than 3.5% and preferably below 2.5% may be from 3 to 4 hours. On the other hand when oxygen is used, in lieu of air, the rate of extraction is almost doubled i.e. the time required to leach out the iron to its ultimate low level in the ore is nearly halved. It has been found however that the total amount of iron removed is substantially the same, irrespective of whether air or $O_2$ is used.

The oxygen, air and/or gaseous $SO_2$ may be introduced into the aqueous slurry using any of the techniques known to the art as for example by spargers or equivalent means. Also the oxidation-leaching treatment may be carried out at atmospheric pressure or at pressures above atmospheric in which case extraction is effected at higher rates. In one embodiment of the invention oxidation-leaching was carried out in a single large cone-bottom tank in which an aqueous slurry of ore concentrate in a solution containing ferrous ions was agitated and the iron fraction oxidized and leached by introducing air or oxygen into the bottom of the tank with or without circulating the slurry by drawing it out from the top of the tank and introducing it into the bottom of the tank.

Following oxidation-leaching of the metallized ore concentrate the slurry is screened to separate and recover the coarse $TiO_2$ concentrate from the fine iron oxide compound. The solid iron oxide compound is then recovered from the leach slurry by filtration and may be washed to remove any residual aqueous solution, dried and used as a pigmentary material or may be reduced to produce a relatively fine commercially saleable iron powder. After removing the iron oxide compound the filtrate, which contains both ferrous and ferric ions, may be reused for oxidation-leaching additional metallized ilmenite concentrate. Thus in a commercial operation the bulk of the reagents would be recycled.

The following examples will illustrate specific embodiments of the invention hereinabove described. In each of the following examples the ilmenite ore was a weathered ilmenite and while any of the weathered ilmenites such as Quilon, North Carolina, Australia or Florida beach sands are amenable to the oxidation leaching process of this invention, the weathered ilmenites of the examples are concentrates prepared from either Florida or Quilon beach sands having a particle size in the range from 35 to 200 mesh. The concentrates were charged together with a solid reductant i.e. anthracite coal in the ratio of 1:1 into a rotating kiln and reduced by heating at about 1175° C. for about 5 hours. The contents of the kiln were then discharged into a rotating cooler and from thence onto a 14 mesh vibrating screen which separated the unconsumed coal from the metallized ore which was then fed to a magnetic separator to separate and remove any residual gangue constituents and fine coal. The gangue-free metallized concentrate was then subjected to the oxidation-leaching treatment of this invention as described in the examples below.

EXAMPLE I 100 grams of upgraded Florida ilmenite concentrate metallized as hereinabove described and analyzing 71.5% $TiO_2$, 22.0% Fe (metallic) and 24.5% Fe (total) were added to an aqueous solution of ferric chloride containing 7.5 grams of $FeCl_3$, the water to ore ratio of said solution being about 7.5. The ferric chloride comprised about 7.1% of the ore concentrate on a weight basis. The pH of the aqueous slurry was about 4.0 and the ore concentrate was kept in suspension by vigorous agitation which was effected by means of a screw impeller while introducing oxygen into the slurry at a flow rate of 2 liters per minute per 100 grams ore. The temperature of the slurry was maintained at between 75–85° C. during the oxidation-leaching reaction. After leaching for 1 hour, a sample of the ore concentrate slurry was taken, filtered and washed on a 325 mesh screen to separate the residual $TiO_2$ concentrate from the iron oxide compound i.e. ferric hydroxide. The $TiO_2$ concentrate was then washed, dried and analyzed about 8.0% residual iron. A second sample was taken following a 2 hour oxidation-leaching period and the $TiO_2$ concentrate analyzed only 2.9% total iron. A third sample taken after oxidation-leaching for 4 hours also analyzed 2.8% iron showing that an oxidation-leaching period of 2 hours was optimum both from the standpoint of low-iron $TiO_2$ concentrate and cost efficiency.

EXAMPLE II

The oxidation-leaching procedure of Example I was again repeated but in this run no oxygen was used that is to say leaching was effected by the ferric chloride alone. A sample of $TiO_2$ concentrate taken after 1 hour contained 20.4% total iron. After 2 hours the amount of iron in the ore remained the same, i.e. 20% and after four hours had only dropped to 19.8% showing conclusively that this amount of ferric ions without the addition of oxygen is sufficient to react with only a small fraction of the iron in the concentrate.

EXAMPLES III–VII

Another series of oxidation-leaching runs was made under conditions somewhat similar to those of Example I except that ferrous sulfate in the form of copperas ($FeSO_4 \cdot 7H_2O$) was used in combination with $H_2SO_4$ to provide ferric ions in solution on oxidation.

The amount of copperas, on an ore weight basis, varied from about 12 to about 300 grams/100 grams ore in 750 ml. of water, while the acid was varied from 1.8% to 3.0% on an ore weight basis. The results of oxidation-leaching periods of from 1 to 4 hours are shown in the table below and again it is clear that optimum leaching both from the standpoint of a low-iron $TiO_2$ concentrate and leaching time is effected in 1 to 2 hours.

EXAMPLE VIII

This run was made using 100 grams of Quilon concentrate which had been metallized in the manner hereinabove described and analyzed 68.0% $TiO_2$, 26.2% Fe (metallic) and 28.1% Fe (total). This reduced concentrate was slurried in a water solution containing 25 grams copperas and 1.8 grams $H_2SO_4$ with a water to ore ratio of 7.5 and then subjected to oxidation-leaching. $O_2$ was sparged into the slurry at 2.0 liters per minute and samples of the $TiO_2$ concentrate were taken after 1 hour, 2 hours and 4 hours.

As shown in the table below minimal removal of iron was effected in 1 hour but after 2 hours and 4 hours the total iron has been reduced to 4.2 and 4.1% respectively, again showing that the optimum oxidation-leaching period of this invention is consistently about 2 hours.

EXAMPLE IX

As mentioned above it was found that while oxidation-leaching of a metallized ore concentrate by the use of oxygen or air in combination with ferrous or ferric ions produced $TiO_2$ concentrates of exceptionally low total iron and in no more than about 2 hours even shorter leaching periods were realized by adding an accelerator such as gaseous $SO_2$ to the slurry during the leaching cycle.

Example IX was run to illustrate the use of gaseous $SO_2$ in the oxidation-leaching of metallized Florida ore using on an ore basis, 25.0% copperas in combination with 1.8% $H_2SO_4$ to provide ferric ions in solution. The gaseous $SO_2$ was added after the first half hour of leaching at the rate of 54 ml./min./100 g. of ore. At the end of 1 hour the total residual iron in the $TiO_2$ concentrate was only 2.7% and after 2 hours was down to 2.5%.

EXAMPLE X

Another run was made similar to that of Example I except the ferric ions were introduced by adding ferrous sulfate buffered with $Na_2SO_4$ and $NaHSO_4$ in combination with an accelerator in this instance citric acid. As shown in the table below residual iron values as low as 2.9% were obtained in the first half hour and dropped to 2.7% after one hour of leaching.

EXAMPLE XI

Another experiment was run on a semi-pilot plant scale in which 22 lbs. of metallized Florida ore, 19.8 gal. of $H_2O$, 2500 g. $FeSO_4 \cdot 7H_2O$ and 180 g. $H_2SO_4$ were charged into a 50 gal. tank. S.c.f.m. oxygen was introduced into the bottom of the tank and the aqueous solution and $O_2$ were recycled continuously.

From the foregoing description and examples it is apparent that $TiO_2$ concentrates having unusually low residual iron can be produced economically and in a surprisingly short period of time by the oxidation-leaching process of this invention wherein a slurry of the metallized ore concentrate in an aqueous solution of ferrous and ferric ions is heated to a temperature of about 75–85° C. and agitated vigorously by or in conjunction with the introduction of air or oxygen.

TABLE

| Exp. | Leaching agents Type | Percent of the ore | Type | Percent of the ore | $SO_2$, ml./min./100 g. ore | $O_2$ flow 1 p.m. | Percent Fe in $TiO_2$ concentrate after leaching for— pH | 0.5 hr. | 1 hr. | 2 hr. | 4 hr. |
|---|---|---|---|---|---|---|---|---|---|---|---|
| I | $FeCl_3$ | 7.1 | | | | 2.0 | 4.0 | | 8.0 | 2.9 | 2.8 |
| II | Same | 25.2 | | | | 2.0 | 4.0 | | 20.4 | 20.0 | 19.8 |
| III | $FeSO_4 \cdot 7H_2O$ | 12.4 | $H_2SO_4$ | 3.0 | | 2.0 | 3.0 | | 9.7 | 2.9 | 2.8 |
| IV | Same | 25.0 | Same | 3.0 | | 2.0 | 3.0 | | 9.0 | 2.8 | 2.8 |
| V | do | 50.0 | do | 1.8 | | 2.0 | 3.3 | | 7.9 | 2.9 | |
| VI | do | 150.0 | do | 1.8 | | 2.0 | 3.3 | | 3.1 | | |
| VII | do | 300.0 | do | 3.0 | | 2.0 | 2.8 | 11.6 | 2.7 | 2.9 | 2.9 |
| VIII* | do | 25.0 | do | 1.8 | | 2.0 | 3.0 | | 10.5 | 4.2 | 4.1 |
| IX | do | 25.0 | do | 1.8 | | 2.0 | 2.0 | | 2.7 | 2.5 | |
| X | $\{FeSO_4 \cdot 7H_2O$ / $Na_2SO_4$ / $NaHSO_4\}$ | {12.5 / 6.5 / 2.1} | Citric acid | 25 | | 2.0 | 3.0 | 2.9 | 2.7 | | |

*Quilon concentrate.

(IX)

Charge 50 gal. tank
22 lbs. ore
10.8 gal. $H_2O$
2500 g. $FeSO_4 \cdot 7H_2O$
180 g. $H_2SO_4$
Charge 50 gal. tank S.c.f.m. oxygen _____ 5–7
Avg. pH _____ 2.5
Percent Fe in $TiO_2$ concentrate:
  1 hr. _____ 8.3
  2 hr. _____ 3.0
  4 hr. _____ ---

While this invention has been described and illustrated by the examples shown, it is not intended to be strictly limited thereto, and other variations and modifications may be employed within the scope of the following claims.

We claim:

1. An oxidation-leaching process for producing a titanium dioxide concentrate from weathered ilmenite ores comprising the steps of: upgrading the ore to remove gangue materials and form an ore concentrate, heating the ore concentrate in a reducing atmosphere to metallize the iron fraction, adding said reduced ore concentrate to water to form an aqueous slurry having an ore to water ratio of about 7.0, leaching the metallic iron from said reduced ore concentrate by mixing said slurry with a salt solution comprising from about 12 to about 300 grams salt per 100 grams of ore, said salt solution comprising essentially a ferrous salt plus a minor amount of ferric ions, heating the mixture at atmospheric pressure to a temperature from 75 to 85° C., maintaining said mixture at said temperature for a period from 1 to 4 hours and during said period introducing a gaseous oxidizing agent selected from the group consisting of air and oxygen into said mixture at the rate of about 2 to 10 liters per minute per 100 grams of ore with vigorous agitation, said ferric ions serving to convert the metallic iron in said ore particles to soluble ferrous salt which by the vigorous agitation of said mixture is leached out of said ore particles, said gaseous oxidizing agent oxidizing the soluble ferrous salt in said mixture, separating and recovering the leached ore as a titanium dioxide concentrate from the solution containing said particulate iron oxide, said leaching step and the introduction of the gaseous oxidizing agent into said leach solution to convert the soluble ferrous salt to solid particulate iron oxide being carried out substantially simultaneously, separating said particulate iron oxide from said iron-oxide containing solution and recycling the iron oxide-free solution to leach a new batch of reduced ore concentrate the rate of oxidation-leaching being increased by introducing an accelerator into the agitated mixture said accelerator being selected from the group consisting of gaseous $SO_2$ and a water soluble sequestering agent.

2. An oxidation-leaching process for producing a titanium dioxide concentrate according to claim 1 wherein the accelerator is gaseous $SO_2$ added at the rate of about 54 ml./min./100 grams ore.

References Cited

UNITED STATES PATENTS

| | | | |
|---|---|---|---|
| 3,252,787 | 5/1966 | Shiah | 75—104 X |
| 3,457,037 | 7/1969 | Aramendia et al. | 75—1 X |
| 2,724,636 | 11/1955 | Mullin et al. | 23—202 X |
| 3,082,059 | 3/1963 | Goren | 75—104 X |
| 2,775,517 | 12/1956 | Mancke | 75—104 X |
| 937,293 | 10/1909 | Elliott et al. | 75—104 |
| 1,485,909 | 3/1924 | Christensen | 75—104 X |
| 3,169,853 | 2/1965 | Van Es | 75—104 X |
| 1,075,093 | 10/1913 | David | 75—104 |

FOREIGN PATENTS

| | | | |
|---|---|---|---|
| 767,560 | 9/1967 | Canada | 75—104 |
| 15,849 | 1911 | Great Britain | 75—104 |

ALLEN B. CURTIS, Primary Examiner

U.S. Cl. X.R.

75—104